United States Patent [19]

Sakamoto

[11] Patent Number: 5,654,823

[45] Date of Patent: Aug. 5, 1997

[54] MICROSCOPE

[75] Inventor: Shinobu Sakamoto, Yokohama, Japan

[73] Assignee: Nikon Corporation, Tokyo, Japan

[21] Appl. No.: 569,399

[22] Filed: Dec. 8, 1995

[30] Foreign Application Priority Data

Dec. 12, 1994 [JP] Japan .................................. 6-307251

[51] Int. Cl.[6] ................................................. G02B 21/00
[52] U.S. Cl. ........................... 359/384; 359/368; 359/380
[58] Field of Search ..................................... 369/368, 432,
369/379–380, 382–384, 694, 696–698,
705–706

[56] References Cited

U.S. PATENT DOCUMENTS 4,518,223   5/1985   Waters ........................... 359/380
5,140,458   8/1992   Takagi et al. ..................... 359/380

FOREIGN PATENT DOCUMENTS 409245   4/1934   United Kingdom ................... 359/383

*Primary Examiner*—Thong Nguyen
*Attorney, Agent, or Firm*—Shapiro and Shapiro

[57] ABSTRACT

There is disclosed a microscope comprising a variable-magnification optical system provided in the optical path of the microscope and having at least an optical member movable in the direction of optical axis of the optical path, to vary the magnification of the observed image of the specimen, a rotary knob for moving the optical member in the direction of optical axis, a position indicating device for indicating when the rotary knob is in a rotary position where the optical member is in a predetermined position and a varying device for varying the predetermined position.

5 Claims, 3 Drawing Sheets

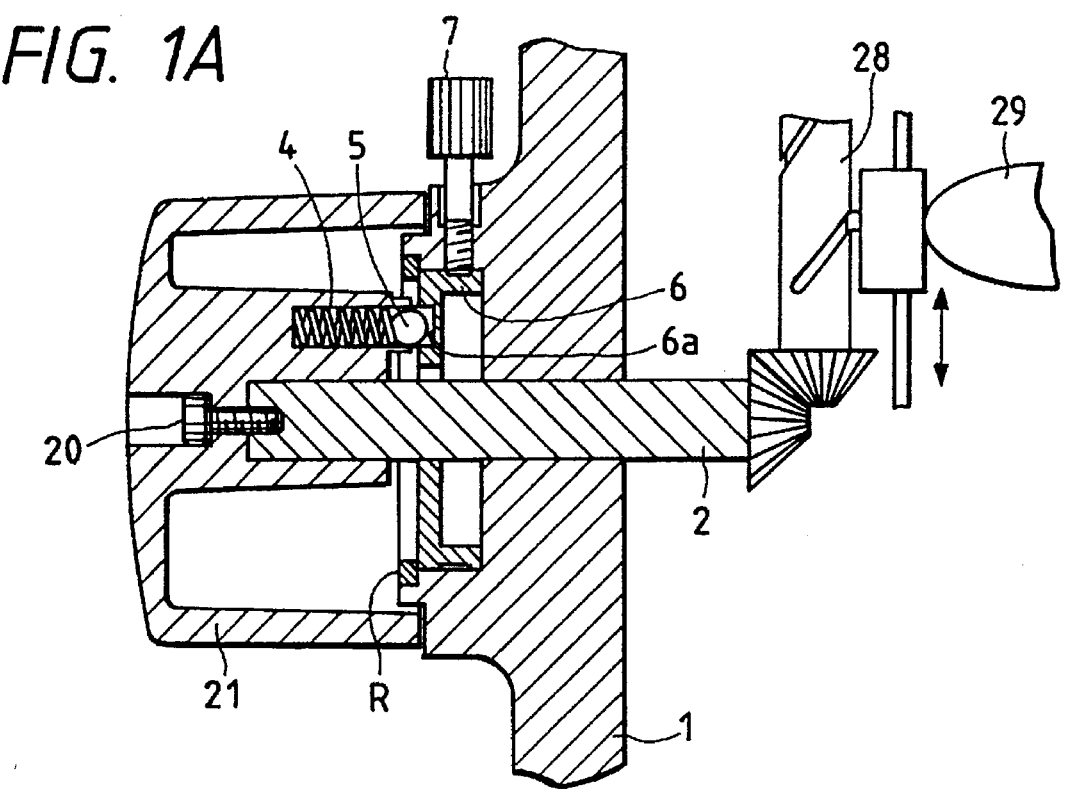
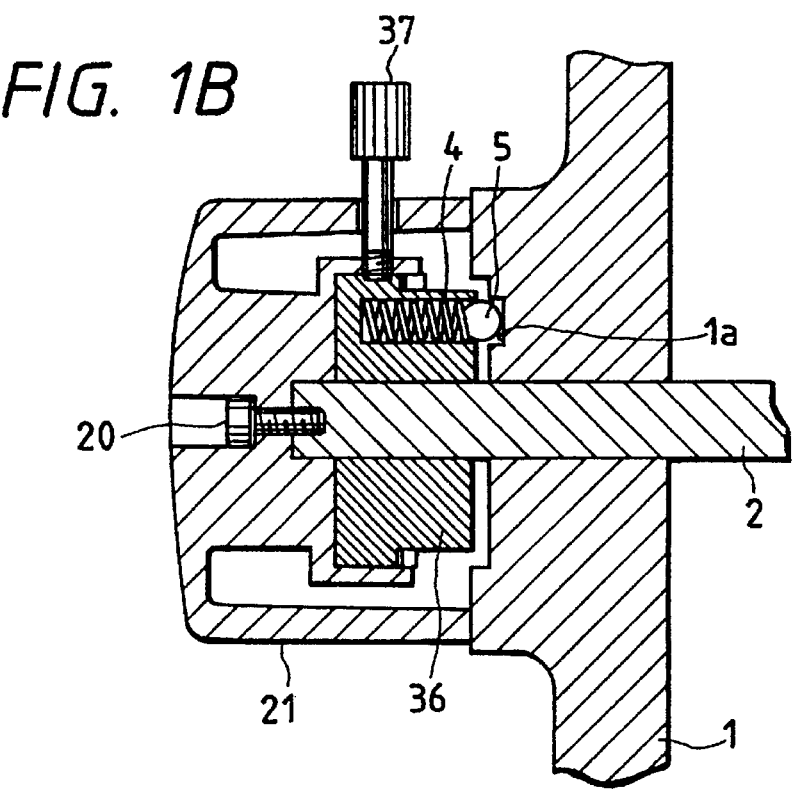

MICROSCOPE

BACKGROUND OF THE INVENTION

1. Field of the Invention

The present invention relates to a microscope, and more particularly to a click-stop structure provided on a rotary knob for continuously varying the magnification of a specimen observed under a microscope.

2. Related Background Art

Some of the conventionally known microscopes are provided with a variable-magnification optical system for varying the magnification of the specimen to be observed through the eyepiece lens of the microscope. Such microscopes are usually provided with a rotary knob for varying the magnification. Such microscopes will be further explained, by referring to a stereoscopic microscope shown in FIG. 4, which is an elevation view of said stereoscopic microscope. On a specimen stage 31 there is placed a specimen S to be observed. The image of the specimen S is observed by an eyepiece lens 34, through an objective 32, and a zoom lens system (variable-magnification optical system) composed of plural lenses provided in the main body (hereinafter called lens barrel) of the microscope. The observer can adjust the magnification of the specimen, observed through the eyepiece lens, by rotating a rotary knob 21, thereby moving at least one lens in the variable-magnification optical system in the axial direction of the objective optical system.

A rotary knob of this kind is illustrated in FIG. 3. The rotary knob 21 is fixed, by a screw 20, to a rotary shaft 2 which engages a magnification-varying cam 28. Thus, rotation of the rotary knob 21 vertically moves the magnification-varying lens 29, thereby continuously varying the magnification. Inside the rotary knob 21 there is provided a steel ball 5 which is pressed by a coil spring 4 in the axial direction of the rotary shaft 2 and fits in a stopping groove 25 provided in the lens barrel 1 of the microscope. Said stopping groove 25 is provided so as to correspond to the rotating position of the rotary knob when the variable-magnification optical system is in a specified magnification. More specifically, a stopping groove is provided for every magnification increase of 1 or 0.5 times. Thus a click-stop mechanism is constituted by the steel ball 5 and the stopping groove 25. On the external periphery 21a of the rotary knob 21 Close to the lens barrel 1, there is provided a magnification scale 26, indicating the image magnification of the variable-magnification optical system, and said scale is adjusted in advance so that the magnification of the variable-magnification optical system is indicated by an index mark 27 of the lens barrel 1.

The magnification varying operation has to be done cautiously by matching a desired value of the magnification scale 26 with the index mark 27 in magnifications other than the above-mentioned specified ones, but, in said specified magnifications, it is only required to match the magnification scale 26 roughly with the index mark 27 and to rotate the rotary knob until the above-mentioned click-stop mechanism functions.

However, the image magnification required by the observer is not necessarily limited to such specified ones, but often varies to various values. For example, in the case of photomicrographing, the magnification does not necessarily match one of the specified ones because the image frame of photographing is selected according to the size of the specimen. Particularly in the case of photographing plural specimens with a constant magnification, it is necessary to operate the rotary knob while watching the magnification scale so as to exactly reproduce the desired magnification or to effect photographing at a magnification, where the click-stop mechanism functions, close to the desired magnification. Such a situation is not satisfactory to the user.

SUMMARY OF THE INVENTION

In consideration of the foregoing, an object of the present invention is to provide a microscope in which the magnification of the specimen can be reset, any number of times, at a preset arbitrary magnification.

The above-mentioned object can be attained, according to the present invention, by a microscope comprising:

a variable-magnification optical system provided in the optical path of the microscope and having at least an optical member movable in the axial direction of said optical path, thereby varying the magnification of the observed image of the specimen;

a rotary knob for moving said optical member in said axial direction;

a position indicating device for indicating when said rotary knob is in a rotary position where said optical member is in a predetermined moving position; and a varying device for varying said predetermined position.

According to the present invention, the varying device can arbitrarily vary the rotary position of the rotary knob, or the moving position of at least an optical member in said variable-magnification optical system, where the position indicating device indicates that the optical member is in a predetermined moving position, whereby the observer can exactly reset the magnification of the specimen, any number of times, at a preset arbitrary magnification.

For example, if the position indicating device includes a click-stop mechanism, it functions to stop the rotation of the rotary knob when a preset magnification is reached. The rotary position of the rotary knob where the click-stop mechanism functions can be adjusted by forming one of the members constituting the click-stop mechanism (for example the stopping groove) on an intermediate member and adjusting and fixing the rotary position of said intermediate device by means of a fixing member.

BRIEF DESCRIPTION OF THE DRAWINGS

FIGS. 1A and 1B are schematic cross-sectional views of first and third embodiments of the present invention;

DETAILED DESCRIPTION OF THE PREFERRED EMBODIMENTS

Figure 3:
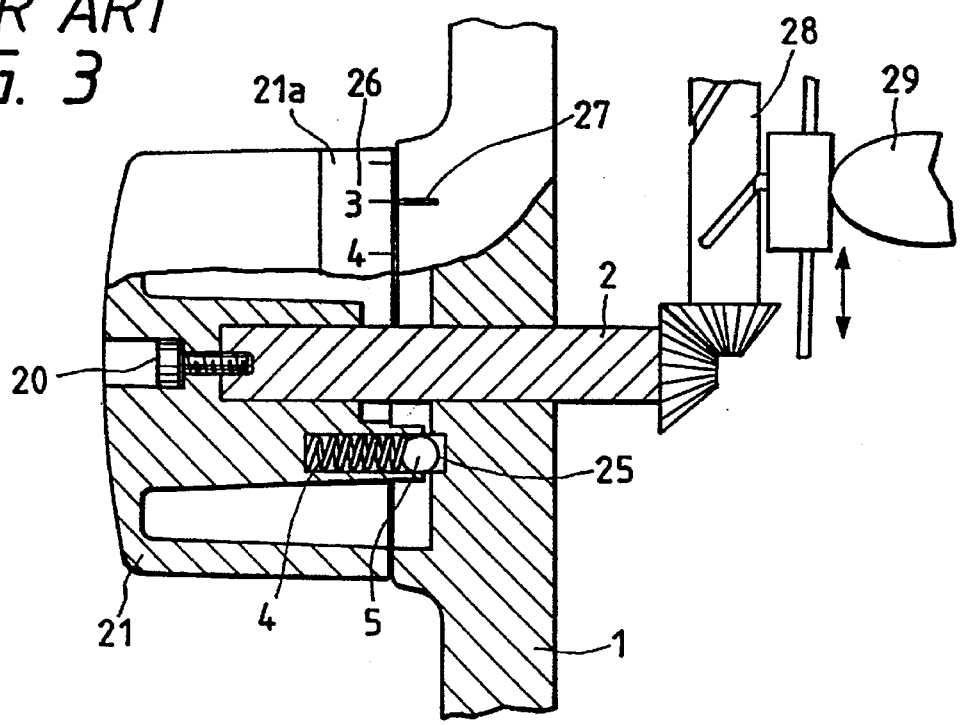
FIG. 3 is a cross-sectional view of a conventional click-stop mechanism.
Figure 4:
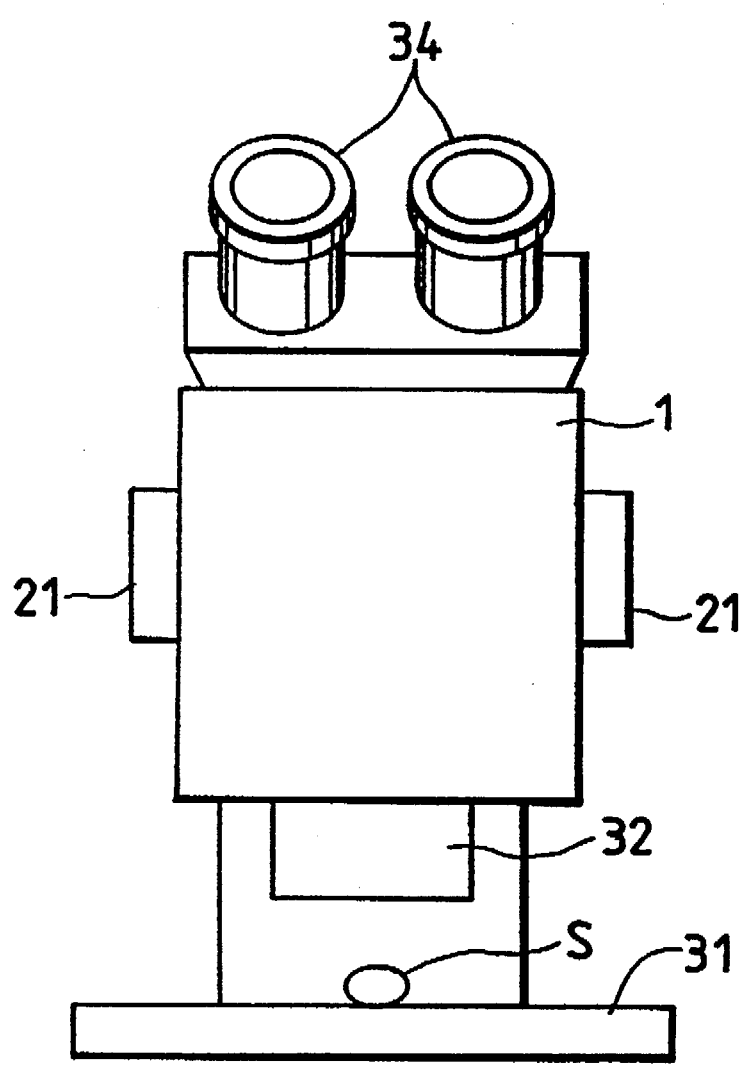
FIG. 4 is a schematic view of a stereoscopic microscope.

FIG. 1A illustrates a first embodiment of the present invention, relating to the rotary knob in the stereoscopic microscope shown in FIG. 4. Components substantially equivalent in function to those shown in FIGS. 4 and 3 are represented by the same symbols.

At an end of a rotary shaft 2 laterally penetrating the lens barrel 1, a rotary knob 21 is fixed by a screw 20. The rotary shaft 2 engages a magnification varying cam 28, whereby the rotation of the rotary knob 21 moves a magnification varying lens through the magnification varying cam 28, thereby continuously varying the magnification.

On a lateral face of the lens barrel 1, a circular ring 6 is provided rotatably about the rotary shaft 2, and is maintained in contact with the lens barrel 1 by means of a ring R. Said circular ring 6 is provided with a stopping groove 6a. Inside the rotary knob 21 there are provided a spring 4 and a steel ball 5 which is pressed by said spring 4 in a direction parallel to the rotary shaft and is arranged so as to engage with the stopping groove 6a of the circular ring 6. Thus a click-stop mechanism is constituted by the spring 4, the steel ball 5 and the stopping groove 6a.

On the lens barrel 1, a clamping screw 7 is screwed in toward the center of the rotary shaft 2. When screwed in, a front end of said clamping screw 7 presses, a lateral face of the circular ring 6, thereby fixing the circular ring 6 with respect to the lens barrel 1. In this state the circular ring 6 cannot rotate. On the other hand, the circular ring 6 can freely rotate when the clamping screw 7 is loosened to liberate the front end thereof from the circular ring 6. If the steel ball 5 is in engagement with the stopping groove 6a in this state, the circular ring 6 rotates smoothly together with the rotary knob 21. In this state the click-stop mechanism 4, 5, 6a serves to rotate the circular ring 6 and the rotary knob 21 in synchronization.

On the other hand, when the clamping screw 7 is screwed in, the rotation of the circular ring 6 is stopped. When the rotary knob 21 is rotated in this state, the steel ball 5 moves in the axial direction of the rotary shaft 2 against the pressure of the spring 4 and escapes from the stopping groove 6a. When the steel ball 5 reaches the position of the stopping groove 6a by further rotation of the rotary knob 21, the steel ball 5 is pressed by the spring 4 and falls into said stopping groove 6a.

In order to cause the click-stop mechanism to function at a desired magnification, at first the clamping screw 7 is loosened, then the steel ball 5 is brought into engagement with the stopping groove 6a, and the rotary knob 21 is rotated to the desired magnification. In this state the clamping screw 7 is screwed in to fix the position of the circular ring 6, whereby the click-stop mechanism will at the desired magnification. The click-stop mechanism indicates when the rotary knob 21 is in a rotary position where the lens 29 is in a predetermined position by, for example, providing a force to stop the rotation of the rotary knob.

Figure 2:
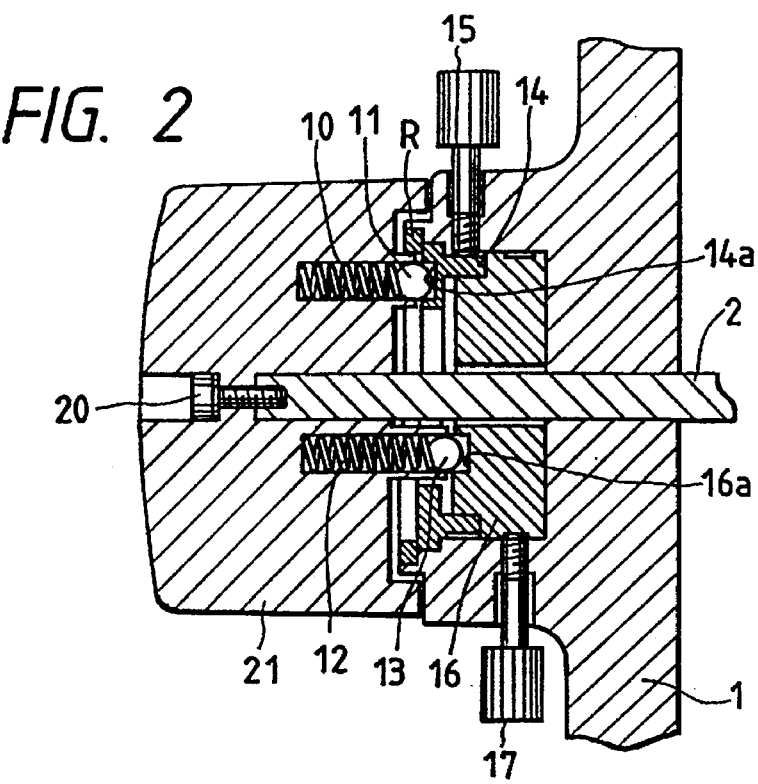
FIG. 2 is a schematic cross-sectional view of a second embodiment of the present invention.

FIG. 2 illustrates a second embodiment of the present invention, in which two members, corresponding to the circular ring 6 in the foregoing first embodiment, are provided along the rotary shaft 2, and the remaining structures are same as in said first embodiment. Thus components that are the same as those in the first embodiment shown in FIG. 1A are represented by the same symbols and will not be explained further.

Between the lens barrel 1 and the rotary knob 21 there are provided circular rings 14, 16 which are rendered rotatable about the rotary shaft 2 and are maintained close to the lens barrel 1 by a ring R. The inner circular ring 16 (at the side of the lens barrel 1) is provided with a stopping groove 16a. The outer circular ring 14 (at the side of the rotary knob) is annular, with a central hollow portion, and is provided with a stopping groove 14a. The rotary knob is provided with springs 10, 12 and steel balls 11, 13 respectively biased by said springs 10, 12 in the direction of the rotary shaft 2. The steel ball 11 engages the stopping groove 14a of the circular ring 14, and the steel ball 13 engages the stopping groove 16a of the circular ring 16 through the central hollow portion of the circular ring 14.

On the lens barrel 1, clamping screws 15, 17, are screwed in toward the center of the rotary shaft 2, for stopping the rotation of the circular rings 14, 16. The clamping screws 15, 17, when screwed in, respectively stop the rotation of the circular rings 14, 16.

The above-explained configuration allows the click stop to be set at two arbitrary magnifications, by the same principle as in the foregoing first embodiment.

In the foregoing two embodiments, the rotary knob is provided with the spring and the steel ball while the circular ring is provided with a groove and the circular ring is fixed relative to the lens barrel, but a similar effect can be attained by a configuration (third embodiment) shown in FIG. 1B, in which a circular ring 36 is provided with the spring 4 and the steel ball 5 while the lens barrel is provided with a groove 1a and the circular ring 36 can be fixed to the rotary knob 21 by tightening a clamping screw 37.

Also, the position indicating device is not limited the click-stop mechanism but can be composed of a configuration capable of informing the observer of the position of the preset magnification in a suitable manner (for example light emission from a lamp or suppressed rotation of the rotary knob) for example when a conductive member provided in a part of the circular ring coincides in position with a conductive member provided in a part of the rotary knob. Also the present invention is applicable not only to a stereoscopic microscope but also to any kind of microscope. Furthermore, the present invention is not limited to the foregoing embodiments but is subject to various modifications within the scope and spirit of the appended claims.

As explained in the foregoing, according to the present invention, the rotary position of the rotary knob where the click-stop mechanism (position indicating device) 4, 5, 6a indicates a lens position can be arbitrarily varied, owing to the fixation of the rotary position of the circular ring (intermediate member) 6 by the clamping screw (varying device) 7. Consequently the observer can set the magnification of the specimen exactly at the preset arbitrary magnification any number of times, so that the operation efficiency can be improved.

What is claimed is:

1. A microscope comprising:
    a variable-magnification optical system provided in an optical path of the microscope and having at least an optical member movable along a direction of an optical axis of said optical path to vary magnification of an observed image of a specimen;
    a rotary knob for moving said optical member along said direction of the optical axis;
    a position indicating device for indicating when said rotary knob is in a rotary position where said optical member is in a predetermined position; and
    a varying device for varying said predetermined position.

2. A microscope according to claim 1, wherein:
    said position indicating device includes an intermediate member mounted between a main body of said microscope and said rotary knob so as to be rotatable coaxially relative to said rotary knob, and a click-stop mechanism provided between said rotary knob and said intermediate member to enable said rotary knob to rotate with said intermediate member relative to said main body; and
    said varying device includes a suppressing member for suppressing rotation of said intermediate member relative to said main body.

3. A microscope according to claim 1, wherein:
    said position indicating device includes an intermediate member mounted between a main body of said microscope and said rotary knob so as to be rotatable coaxially relative to said rotary knob and rotatable relative to said main body, and a click-stop mechanism provided between said main body and said intermediate member; and said varying device includes a suppressing member for suppressing rotation of said intermediate member relative to said rotary knob.

4. A microscope comprising:

a variable-magnification optical system provided in an optical path of the microscope and having at least an optical member movable along a direction of an optical axis of said optical path to vary magnification of an observed image of a specimen;

a rotary knob for moving said optical member along said direction of the optical axis;

an intermediate member mounted between said rotary knob and a main body of said microscope so as to be rotatable coaxially relative to said rotary knob and rotatable relative to said main body;

a fixing device for fixing said intermediate member so as to be non-rotatable relative to said main body; and a connecting mechanism disposed between said rotary knob and said intermediate member and adapted to cause said rotary knob and said intermediate member to rotate integrally when said fixing device does not fix said intermediate member and said rotary knob is in a predetermined rotary position.

5. A microscope comprising:

a variable-magnification optical system provided in an optical path of the microscope and having at least an optical member movable along a direction of an optical axis of said optical path to vary magnification of an observed image of a specimen;

a rotary knob for moving said optical member along said direction of the optical axis;

an intermediate member mounted between said rotary knob and a main body of said microscope so as to be rotatable coaxially relative to said rotary knob and rotatable relative to said main body;

a fixing device for fixing said intermediate member so as to be non-rotatable relative to the rotary knob; and a connecting mechanism disposed between said main body and said intermediate member for providing said intermediate member with a force for suppressing rotation of said rotary knob when said fixing device fixes said intermediate member and said rotary knob is in a predetermined rotary position.

* * * * *